March 24, 1959  O. DAHLE ET AL  2,879,394
EXPOSURE METER FOR ELECTRON MICROSCOPES
Filed Oct. 26, 1954
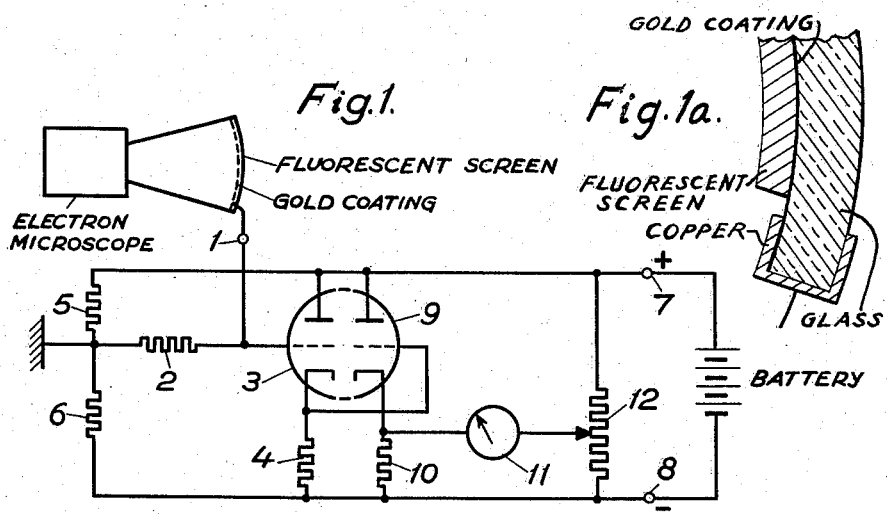
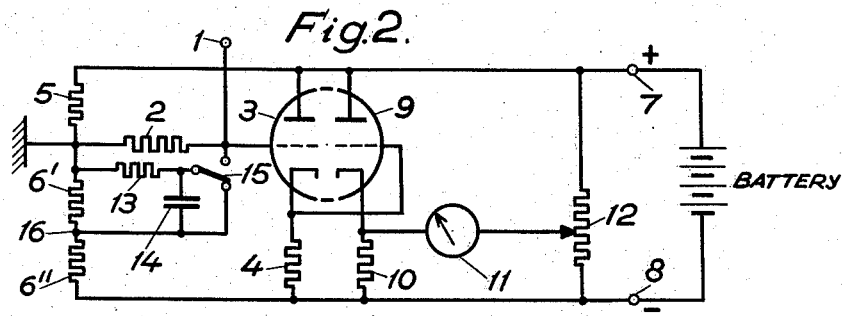
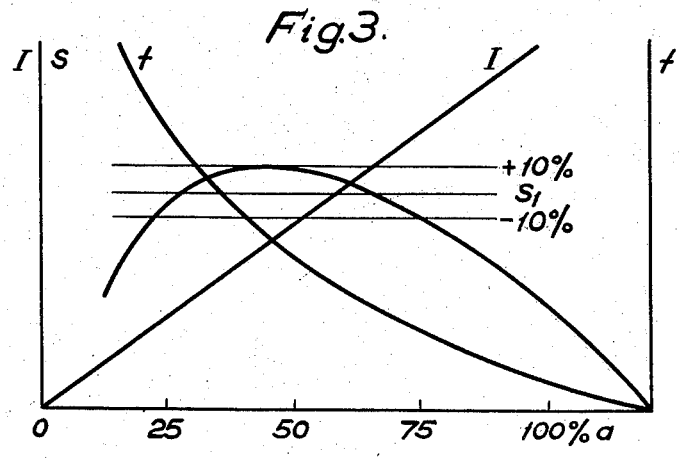
INVENTORS.
Orvar Dahle,
Birgit Dahle and
BY    Hans Pedersen
Attorney

United States Patent Office 2,879,394
Patented Mar. 24, 1959

2,879,394

EXPOSURE METER FOR ELECTRON MICROSCOPES

Orvar Dahle, Birgit Dahle, and Hans Pedersen, Vasteras, Sweden, assignors to Allmänna Svenska Elektriska Aktiebolaget, Vasteras, Sweden, a corporation of Sweden Application October 26, 1954, Serial No. 464,674

Claims priority, application Sweden November 4, 1953

7 Claims. (Cl. 250—49.5)

Electron microscopes are not usually provided with any device for determining the suitable exposure time when making a photographic record, this time either having to be estimated or determined by comparison of the brightness of the fluorescent image with an adjustable comparison light source. An estimation without the aid of instruments is very difficult and often results in uneven exposures. This involves several drawbacks. Besides the direct waste of time for repeated exposures, there is the still greater disadvantage that sensitive specimens often change when exposed to the electron beam, so that a new exposure will not give a perfect picture. In addition, a wrong exposure involves that delicate details in the image may disappear. A great disadvantage with uneven exposures is also that individual developing must be applied to eliminate exposure errors, which will take much longer than tank developing, which can be used, when all photographic plates have uniform degree of exposure.

Attempts have been made to provide an electron microscope with a photoelectric exposure meter. Owing to the very small light intensities in question an electron multiplier photocell has to be used connected to a subsequent thermionic tube amplifier.

The present invention offers a simpler solution of this problem in that the fluorescent coating of the viewing screen of the electron microscope is grounded via a current measuring device, by means of which the electron current to the viewing screen can be determined and used as a measure of the ability of the electron beam to expose the photographic film or plate. In order to achieve this result, the fluorescent coating of the image screen may not have any direct ground connection. Possibly a very sensitive reflecting galvanometer could be used for measuring the screen current, which amounts to about $10^{-9}$ or $10^{-10}$ amperes. According to the present invention, however, a much cheaper and simpler solution has been chosen in that the fluorescent coating is grounded via a high resistance of about $10^{10}$ ohms, so that the voltage drop due to the screen current, amounting to several volts, can be measured by aid of a thermionic amplifier, to the output circuit of which either a measuring instrument or a tuning indicator or some other indicating device is connected for determining the suitable screen current intensity.

In those cases, where the fluorescent screen is of a transparent type and consists of a coating on glass, the conductivity of the coating may be so low that a disturbing time delay of the indication will be obtained. This can be avoided, if the glass is first coated with a thin conducting layer, for instance of gold. This layer can be made so thin that the light intensity of the screen will not be appreciably decreased. The conducting coating gives the further advantage that undesirable charging of the screen can be eliminated, which would otherwise cause serious blurring.

The invention will be further described in connection with the accompanying drawing, on which—

Fig. 1 illustrates one form of the invention;
Fig. 1a is an enlarged cross-section through a portion of the screen of Fig. 1;
Fig. 2 illustrates a second modification of the invention; and
Fig. 3 shows a diagram of screen current, exposure time and resulting exposure against scale reading.

In Fig. 1 the terminal 1 is connected to the fluorescent screen and via a high resistor 2 to ground. The voltage drop across the resistor 2 caused by the screen current is supplied to the grid of a thermionic tube, as indicated for instance to one half 3 of a double triode. The triode 3 is cathode coupled by means of a very high cathode resistor 4 for obtaining the smallest possible grid current. A voltage divider 5, 6 is arranged to provide a suitable operating point for the triode, the voltage divider being connected to plus-voltage at the terminal 7 and to minus-voltage at the terminal 8.

The cathode voltage from the triode 3 is supplied to the other triode 9, the latter also being cathode coupled by means of the cathode resistor 10. A direct-current instrument 11 is connected as an output instrument between the cathode of the triode 9 and a voltage divider 12. The instrument 11 will give a reading proportional to the electron beam current to the fluorescent screen connected to the terminal 1.

According to the form illustrated in Fig. 2 the electronic amplifier is not only used to give an indication of the suitable screen current but also as an exposure timing device by the connection of an RC-circuit, consisting of the resistor 13 and the capacitor 14. By means of a change-over switch 15 either only the high resistor 2 or this resistor in parallel with the RC-circuit may be connected to the grid of the triode 3. When the change-over switch 15 has the position shown in the figure, the instrument, as described above, serves as an exposure meter. After completed measuring a photographic film or plate is inserted in the path of the electron beam, and when the exposure shall begin, the switch 15 is changed over to the upper position according to Fig. 2, so that terminal 1 will suddenly obtain the same potential as the junction point 16 between the resistors 6' and 6", substituting the above mentioned resistor 6 in the voltage divider 5, 6. The latter should suitably be so dimensioned that full-scale deflection is obtained on the instrument. As the capacitor 14 is being charged via the resistor 13, the potential at the terminal 1 will rise to zero, and simultaneously the instrument deflection will fall to zero.

If the RC-circuit 13, 14 is suitably dimensioned, the desired density will be obtained, if the exposure is interrupted in that moment when the pointer of the instrument on its way from full-scale deflection to zero passes the point on the scale reached when measuring the screen current. A requirement for the correct functioning of the device is that this point on the scale lies within the range of the scale, in which the product of screen current and exposure time can be regarded as constant. Such a range will be obtained, as the screen current is mainly a linear function, and at least part of the exposure-time curve can be regarded as a hyperbola. Usually the useful reading of the instrument will lie between 25 and 75 percent of full-scale deflection. This is shown in Fig. 3, according to which screen current I and exposure time $t$ and the product of these quantities, i.e. the exposure S, have been plotted as functions of the scale deflection $a$, assuming that the RC-circuit is suitably dimensioned. The exposure curve has a relatively flat maximum, so that, when using this method for determining the exposure time, the variation in exposure can be held within ±10 percent of the ideal $S_1$ for all screen current values between 25 and 75 percent of full-scale deflection.

The resistor 13 in Fig. 2 is not basically necessary, and a suitable time constant may instead be obtained by charging the capacitor 14 solely via the high resistor 2. If, however, the resistor 13 having a magnitude of about 1/100 of the resistor 2 is added, a reduced sensitivity can be obtained, which can be important when scanning areas of the examined specimen with empty mesh openings.

We claim as our invention:

1. An electron microscope provided with an insulated viewing screen and a fluorescent coating on the inner side of said screen, a current measuring device including means for grounding said fluorescent coating through said measuring device, an impedance and a current indicating member responsive to the current from said fluorescent coating through said impedance to ground.

2. An electron microscope as claimed in claim 1, in which said impedance is a resistor of high resistance, and said measuring device is a vacuum tube volt meter for measuring the voltage drop in said resistor.

3. An electron microscope as claimed in claim 1, in which said impedance is a resistor of high resistance, and said measuring device has a thermionic tube amplifier arranged for indicating a predetermined value of the current flowing through said resistor.

4. In an exposure meter for photographic recording with an electron microscope having an insulated viewing screen, an electronic measuring device having a terminal for connection to the insulated viewing screen of the microscope, said device comprising an impedance connected between said terminal and ground, and means for indicating the screen current passing through said impedance.

5. A device according to claim 4, in which said impedance is a resistor of high resistance and the measuring device comprises a thermionic tube amplifier, a voltage source connected to said amplifier, a current indicating device associated with the output terminals of said amplifier and the anode voltage source thereof, said measuring device being arranged to measure the voltage drop in said resistor due to the screen current through it.

6. A device according to claim 4, in which said impedance is a resistor of high resistance, and the said measuring device comprises a thermionic tube arranged to measure the voltage drop in said resistor, and a measuring instrument for indicating said voltage drop, and means for producing a time dependent voltage and including a capacitor and a resistor connected in series to a direct voltage source, and means for substituting the said dependent voltage for the said voltage drop in the said measuring means.

7. A device according to claim 4, in which said impedance is a resistor of high resistance, and the said measuring means comprises a thermionic tube measuring device arranged to measure the voltage drop in said resistor, a current indicating instrument having a scale and a pointer and connected to the said measuring device, means producing a time dependent voltage and consisting of a capacitor and a resistor connected in series to a direct voltage source, means for substituting the said time dependent voltage for the said voltage drop in the measuring means, so that the pointer of said indicating instrument moves in a direction opposite to that for the measurement of said voltage drop, and the time interval for reaching the same point in the scale of the instrument determines the exposure time.

References Cited in the file of this patent

UNITED STATES PATENTS

| | | |
|---|---|---|
| 1,760,597 | Hoare | May 27, 1930 |
| 2,190,200 | Victoreen | Feb. 13, 1940 |
| 2,403,664 | Langer | July 9, 1946 |
| 2,561,988 | Longini | July 24, 1951 |
| 2,597,383 | Samuel | May 20, 1952 |